United States Patent [19]
Duke

[11] Patent Number: 4,896,911
[45] Date of Patent: Jan. 30, 1990

[54] AUTOMOBILE SIDE PROTECTOR

[76] Inventor: Vincent M. Duke, 1452 Candlewood Dr., Worthington, Ohio 43085

[21] Appl. No.: 252,304

[22] Filed: Oct. 3, 1988

[51] Int. Cl.<sup>4</sup> ............. B60R 19/42; B65D 65/08; B65D 65/14
[52] U.S. Cl. .................... 293/128; 296/136; 150/166
[58] Field of Search ............. 293/102, 126, 127, 128; 296/136, 152, 207; 280/770; 150/166

[56] References Cited

U.S. PATENT DOCUMENTS

| | | | |
|---|---|---|---|
| 3,298,712 | 1/1967 | Greenstadt | 150/166 |
| 3,704,037 | 11/1972 | Glassberg | 296/152 |
| 4,355,839 | 10/1982 | Rosen | 296/136 |
| 4,531,560 | 7/1985 | Balanky | 296/136 |
| 4,596,418 | 6/1986 | Koh | 296/136 |
| 4,734,312 | 3/1988 | Sygiyama | 150/166 X |
| 4,750,767 | 6/1988 | Barnett | 293/128 |
| 4,810,015 | 3/1989 | McNeil | 296/136 X |

FOREIGN PATENT DOCUMENTS 2543891 10/1984 France ................... 296/136

Primary Examiner—Andres Kashnikow
Assistant Examiner—Timothy Newholm
Attorney, Agent, or Firm—Biebel, French and Nauman

[57] ABSTRACT

An automobile side protector is provided for attachment alongside an automobile. The side protector is fabricated from a flexible sheet form member which is conformable to the body shape of the automobile. The sheet form member has a front and rear flap, with the front flap capable of insertion into a hood seam for retention therein and a rear flap having a relatively nondeformable object secured thereto which restrains the separation of the sheet form member from the automobile when the relatively nondeformable member is positioned within the interior of the automobile. Additional retention means which extend downwardly from each flap secure the bottom of the flaps to the automobile. The center portion of the sheet form member has supplemental retention means to aid in the securing of the center portion of the protector to the automobile.

19 Claims, 5 Drawing Sheets

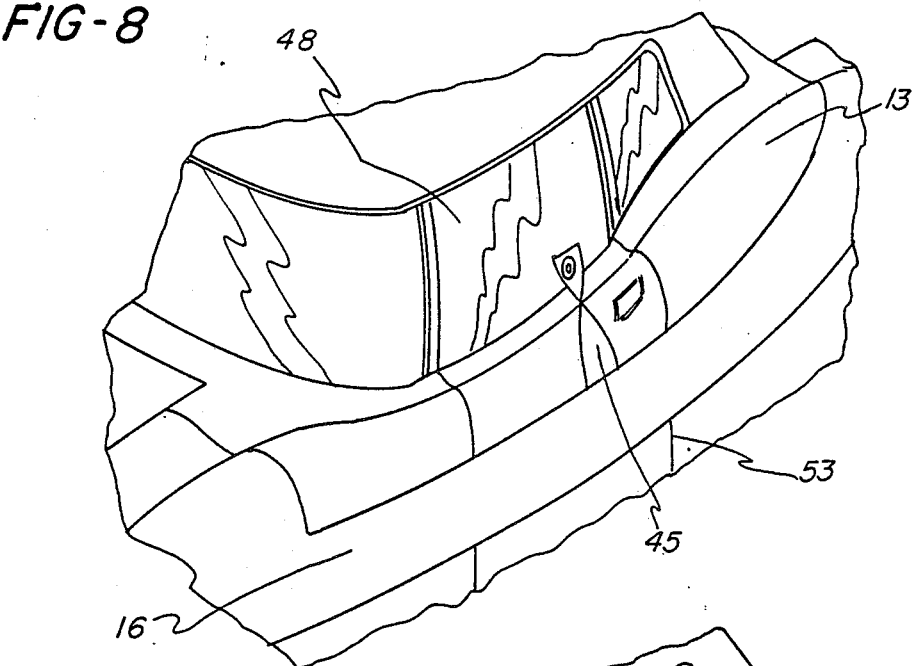
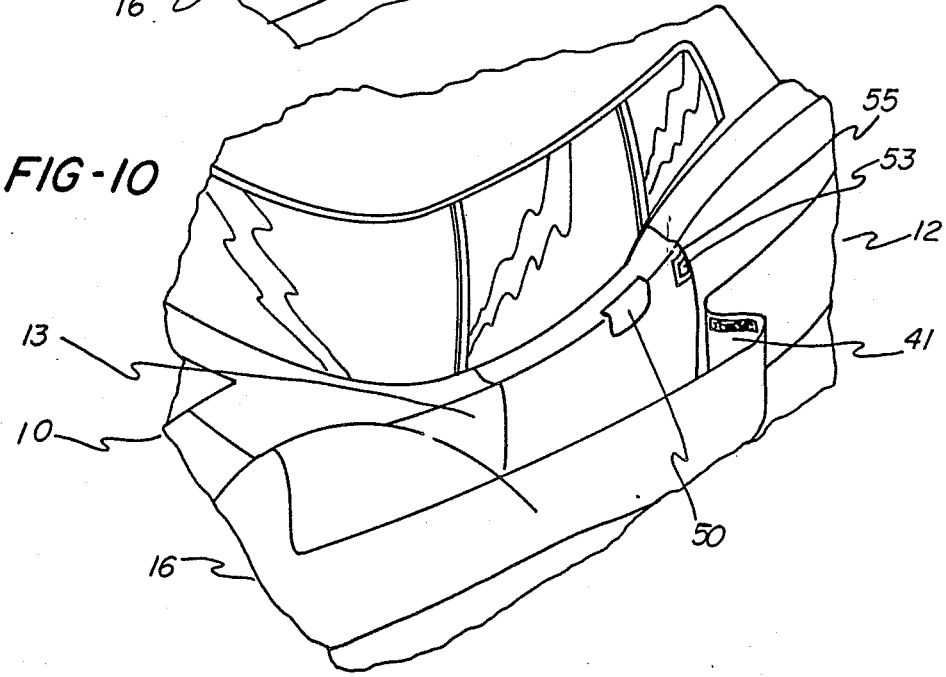

AUTOMOBILE SIDE PROTECTOR

BACKGROUND OF THE INVENTION

The present invention relates generally to a protective device for the sides of automobiles, and more particularly to one which is conformable to the body of the automobile.

Since the invention of the automobile, automobile owners have been plagued by having their cars dented and scratched when parked and left unattended. The solutions proffered by major automobile manufacturers include the attaching of exterior side molding strips or bumpers to the sides of the automobile, or the placing of a plastic or rubber edge guard along the door frame such that when it is opened, its metallic edge will not come into direct contact with the finish of an adjacent parked car. Neither of these solutions has proved workable, since both are dependent upon the type of car that is parked in the next space and this, of course, may change during the duration that ones own car is left parked and unattended.

As a result, numerous inventions have been designed to cope with the problem, yet the problem still continues. Barnett, U.S. Pat. No. 4,750,767 discloses a pad designed to protect the door area of a car, which is hung downwardly from the top of the door to be protected. Forbes, U.S. Pat. No. 4,014,583 discloses a bump protector hung along the side of a car by straps which are secured to the interior roof of the car.

Other means of attachment are known, as in Balanky, U.S. Pat. No. 4,531,560 which discloses a protective cover secured to the side of a vehicle by spaced magnets and manually bendable tab clasps positioned around the perimeter of the vehicle. Additionally, Boyd, U.S. Pat. No. 4,639,027 discloses an automobile side cover secured by a strap which encircles the automobile's door, with the cover having additional straps to secure the bottom portion of the cover to the automobile. Rosen, U.S. Pat. No. 4,355,839 discloses a theft deterrent device for car covers.

Although the above patents have sought to eliminate the problem, none permit the quick and convenient storage of the unit, especially should the cover be covered with rain, snow or ice. Additionally, the type of side covers which hang from a door frame suffer due to the longitudinal limitation associated with the covers. Further, many of the existing side guards are not aesthetically pleasing, such that an owner of a relatively expensive car would not find it desirable to utilize them.

It is thus apparent that the need exists for a automobile side protector which minimizes the denting of or chipping of paint from the sides of automobiles, is quickly removable to a place of storage, and is aesthetically pleasing to the eye.

SUMMARY OF THE INVENTION

The problems associated with the prior automobile side protectors are overcome in accordance with the present invention by forming a side protector from a flexible sheet form member which is conformable to the body of an automobile, with the sheet form member having a front flap and a rear flap. The front flap is capable of being inserted into a hood seam for retention therein. The rear flap has a relatively nondeformable object secured thereto which restrains the separation of the flexible sheet form member from the automobile when the relatively nondeformable member is positioned within the automobile.

The flexible sheet form member preferably has a portion of its rear flap secured to fastening means located in the trunk of the automobile. The sheet form member may thus be secured to the interior of the automobile at all times. For purposes of storage, the side protector may be folded into the trunk. In its operative position, the automobile side protector extends from the rear fender of the automobile along the side of the vehicle and terminates on the front fender preferably in front of the wheel well. Two straps, one at the lower front corner and one at the lower rear corner of the sheet form member permit the lower portion of the side protector to be secured at a point along the bottom of the vehicle.

Additional support for the center portion of the sheet form member may be provided by magnets, a strap member extending from the sheet form member for retention against the car body or side windows, or by a similar strap which reattaches to the automobile side protector.

It is a primary object of the present invention to provide an automobile side protector which extends essentially completely along the side of an automobile. Additionally this side protector should be easy to install in its operative position, as well as to remove and store. Further, it should be aesthetically pleasing.

Other objects and advantages of the invention will be apparent from the following description, the accompanying drawings and the appended claims.

BRIEF DESCRIPTION OF THE DRAWINGS

FIG. 8 is a perspective view on an enlarged scale similar to the center portion of the side protector shown in FIG. 3 but of another modified structure.

FIG. 9 is a perspective view on an enlarged scale similar to the center portion of the side protector shown in FIG. 3 but of yet another modified structure.

DETAILED DESCRIPTION OF THE INVENTION

Figure 1:
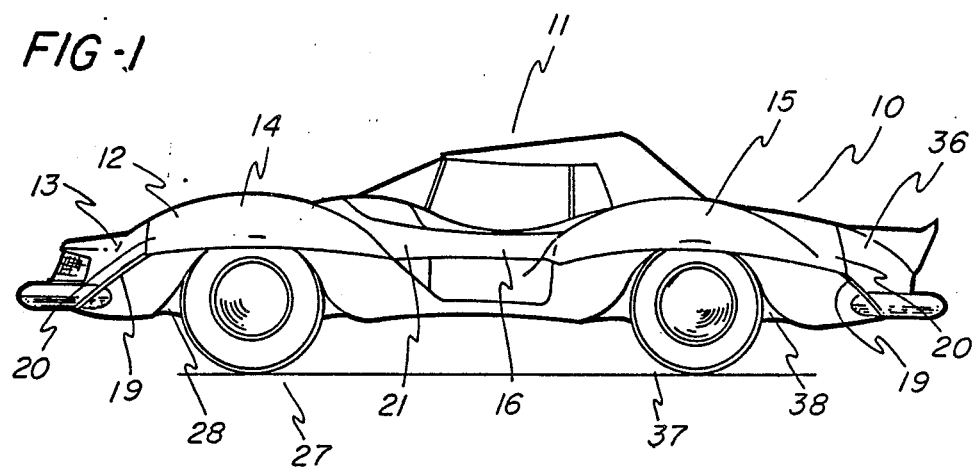
FIG. 1 is a side view of an automobile provided with an embodiment of the side protector in accordance with the present invention.
Figure 2:
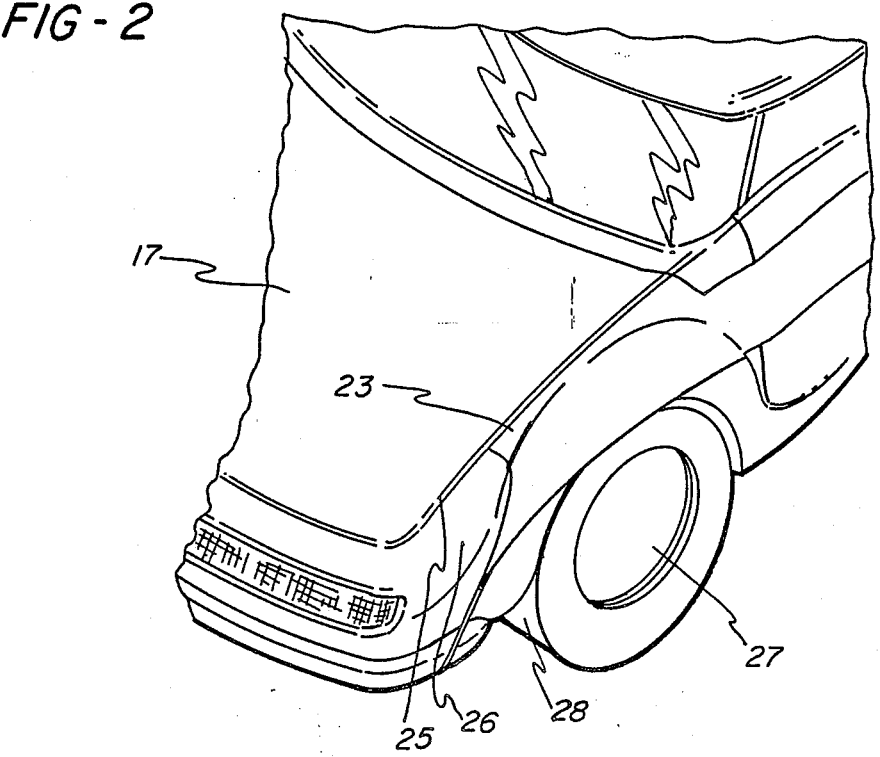
FIG. 2 is a front perspective view on an enlarged scale of the front flap portion of the invention in its operative position.
Figure 3:
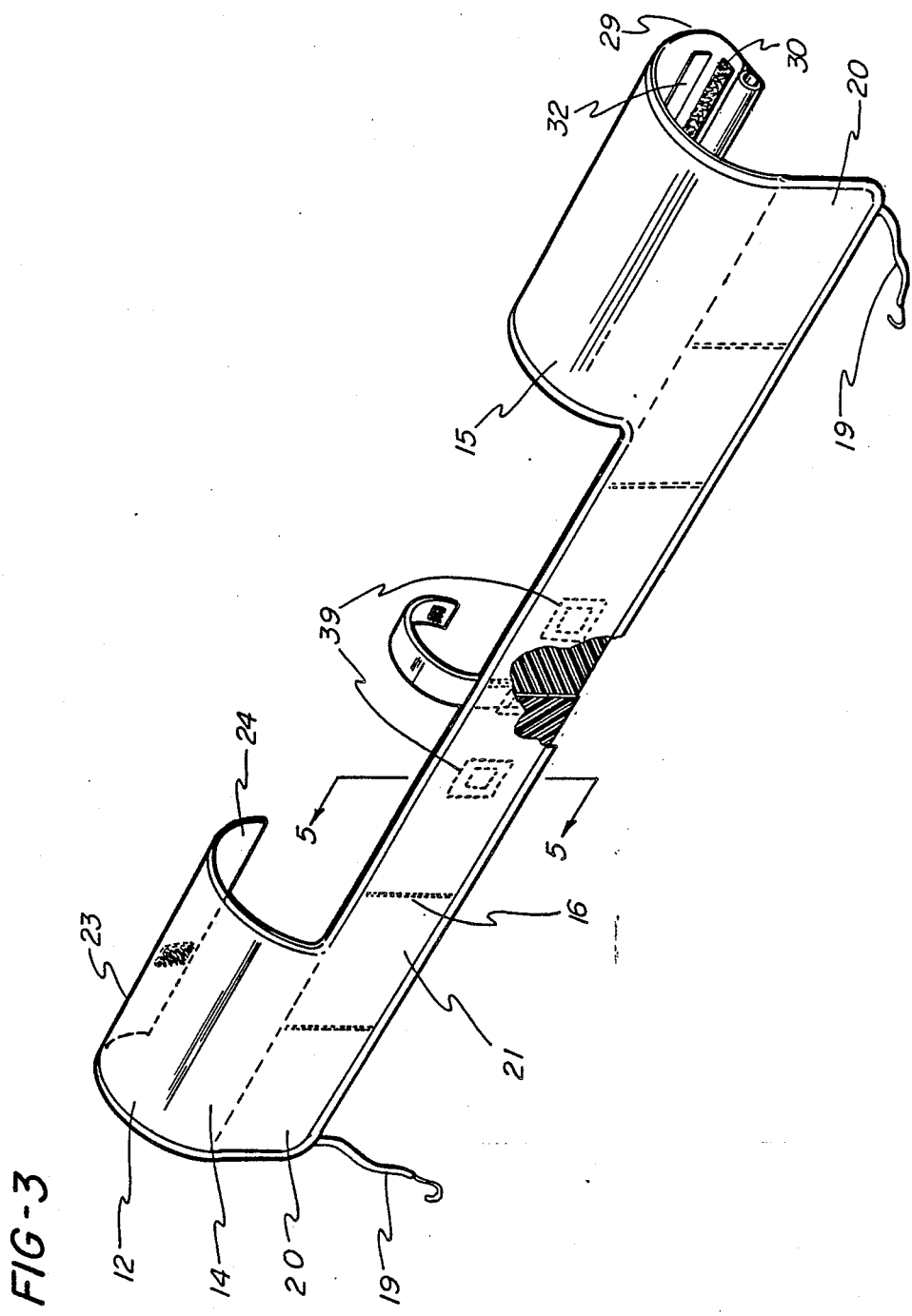
FIG. 3 is a perspective view of the automobile side protector of this invention.

Having reference to the drawings, attention is directed first to FIG. 1 which illustrates an automobile side protector embodying this invention designated generally by the numeral 10, installed in operative relationship on automotive vehicle 11. As can be seen in FIG. 1 as well as FIGS. 2 and 3, the automobile side protector 10 is fabricated from a flexible sheet form member 12 which is conformable to the auto body 13. The flexible sheet form member 12 has a front flap or portion 14, a rear flap or portion 15, and a center portion 16. The front flap 14 is positioned adjacent hood 17, while the rear flap 15 is positioned near trunk 18.

Supplemental flap retention means 19 extend downwardly from lower corners 20 of the lower portion 21 of the flexible sheet form member 12. Preferably these supplemental flap retention means 19 are elastic straps with hook-like members at their terminal ends for securing of the lower portion 21 of the side protector 10 to auto body 13.

The front flap 14 has a front flap top edge 23 to which is secured a relatively rigid strip form member 24. This relatively planar member is insertable in hood seam 25 located between the front fender 26 and the hood 17. Thus, when the front flap 14 of the side protector 10 is installed in its operative position, it overlays a portion of the front fender with its front end terminating forwardly of front wheel 27 and preferably forwardly of front wheel well 28.

Rear flap 15 has a rear flap top edge 29 to which is attached a relatively nondeformable object 30. This relatively nondeformable object 30 may be a dowel or plastic strip of a sufficient width such that the portion of the rear flap to which it is secured is retainable in the interior of the automobile when trunk 18 is closed. The relatively nondeformable object prevents the easy theft of this device from the automobile to which it is secured, since it is appreciated that due to its aesthetically pleasing appearance, the invention will often be found on relatively expensive cars and thus potentially enjoy favor as a status symbol.

Figure 4:
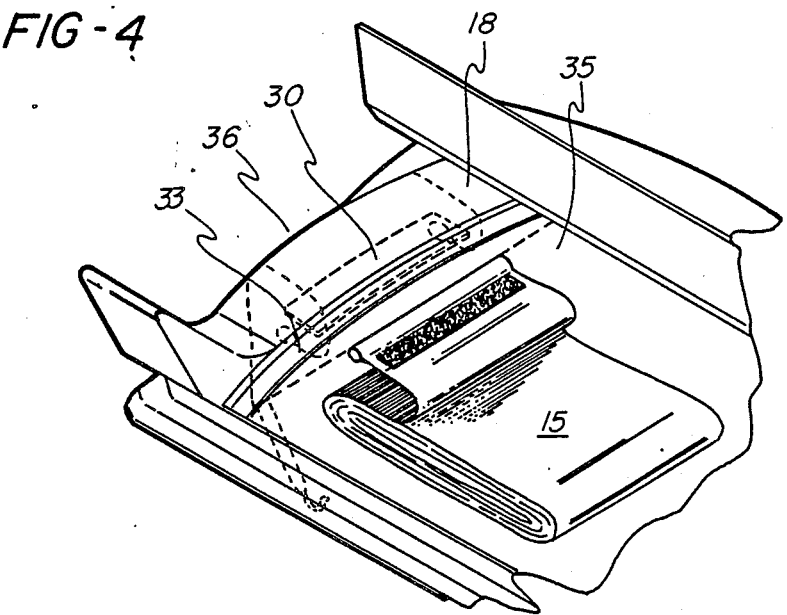
FIG. 4 is a partially broken away perspective view of the trunk portion of an automobile showing the invention in its stored configuration.

As can be seen in FIG. 4, rear flap 15 also has secured thereto rear flap retention means 32 which are securable to interior retention means 33 positioned in the trunk cavity 35. Preferably the interior retention means are placed on the inside of rear fender 36 such that in its operative position, the rear flap 15 extends overlays rear fender 36 and terminates to the rear of rear wheel 37 and preferably to the rear of rear wheel well 38.

Figure 5:
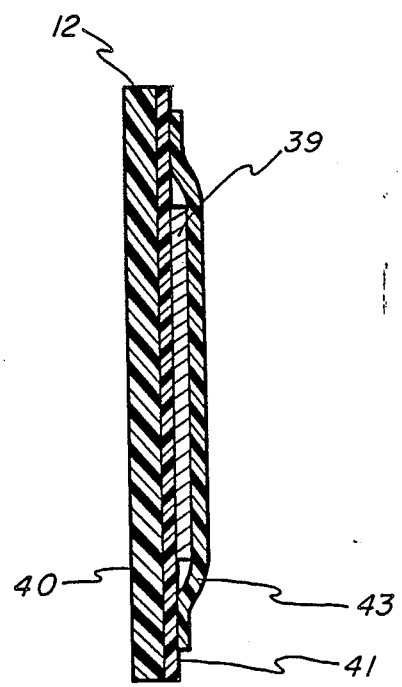
FIG. 5 is a vertical sectional view on an enlarged scale taken along line 5—5 of FIG. 3.

To assist in retention of center portion 16 to auto body 13, such that the center portion 16 does not sag and thus look aesthetically undesirable, supplemental retention means 39 are provided. As can be seen in FIG. 5, one embodiment for the supplemental retention means are a plurality of magnets positioned adjacent flexible sheet form member 12. Flexible sheet form member 12 has an exterior surface 40 as well as an interior surface 41. Preferably exterior surface 40 is of a vinyl or water-resistant fabric, which in addition to being aesthetically pleasing is relatively light in weight so as not to be cumbersome in the installation and removal of the side protector. Interior surface 41 is preferably fabricated from a soft material so as not to be abrasive to the finish of the automobile, and to provide for a slight cushion so as to minimize the possibility for dents or chipped paint. As can be seen in FIG. 5, the magnets 39 are retained in an enclosure 43 which preferably is fabricated from a lightweight fabric such as cotton or felt. The relation of the size of the magnet and the dimension of the fabric forming the wall of the enclosure 43 is critical in that the strength of the magnet when enclosed must be great enough so as to preclude movement of the cover once the protector is placed in its operative position.

Figure 6:
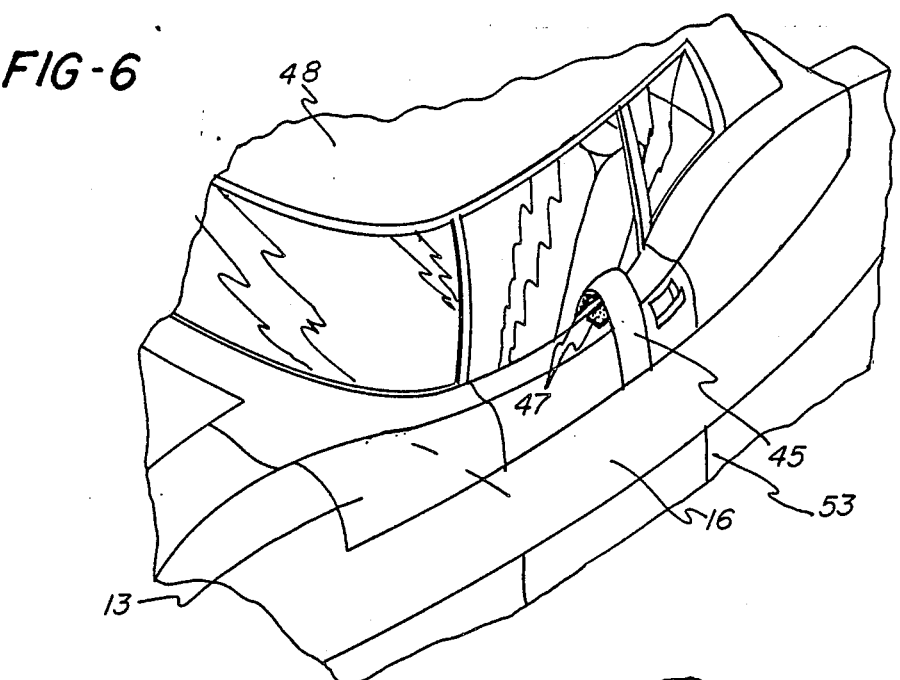
FIG. 6 is a perspective view on an enlarged scale similar to the center portion of the side protector shown in FIG. 3 but of a preferred structure.
Figure 7:
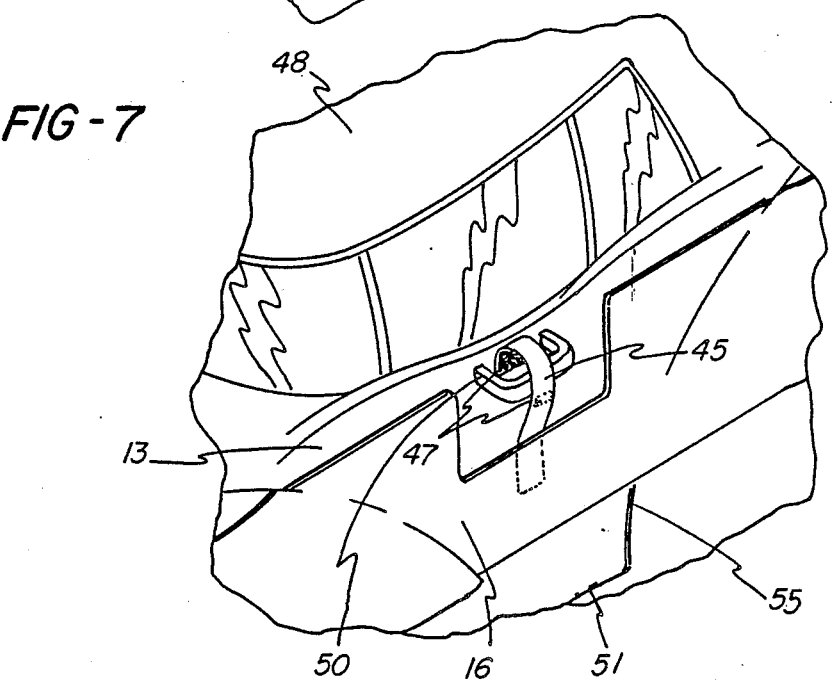
FIG. 7 is a perspective view on an enlarged scale similar to the center portion of the side protector shown in FIG. 3 but of a modified structure.

FIG. 6 discloses the preferred embodiment of the invention wherein a center strap 45 is secured to center portion 16 with supplemental retaining means 47 cooperating with one another so as to secure center strap 45 to auto body 13. Whereas FIG. 6 shows the securing taking place near a window 48, FIG. 7 shows the center strap 45 and a modified embodiment of the invention with supplemental retaining means 47 cooperating to secure the strap to itself, such that the strap reattaches to itself after encircling at lease a portion of handle 50. In this particular modification of the embodiment, the center portion may have to be configured so as to partially encircle handle 50, thereby disclosing a cutaway portion 51.

FIG. 8 shows yet another modified embodiment of the invention with center strap 45 having suction cap 52 secured thereto for attachment to window 48 thereby permitting the retention of center portion 16 against auto body 13. Yet another possible modified embodiment of the center portion of the invention is shown in FIG. 9, wherein supplemental retention means 53 are secured both to auto body 13 as well as directly to the interior surface 41 of flexible sheet form member 12. Preferably this modification of the invention locates one of the cooperative supplemental retention means 53 adjacent door edge 55. With that particular component of the supplemental retention means 53 being secured thereto by conventional means.

To assist in the ease of manufacture of this automobile side protector, it is desirable that the rear flap retention means 32, the interior retention means 33 and the supplemental retention means shown in FIG. 6, 7 and 9 all utilize the same type of retention means, such as VELCRO ® tape. It will also be appreciated that the rear flap has a greater height dimension than does the front flap.

When installed in its operative position, the sheet form member covers up to approximately the upper sixty percent of the side of the automobile. The automobile side protector disclosed by this invention is easy to place in its operative position, with this being accomplished by opening the trunk wherein the side protector may advantageously be retained in a folded position with the rear flap top edge secured by means of the rear flap retention means 32 to the interior retention means 33. Once the trunk lid is opened, the folded portion of sheet form member 12 may be removed from the trunk cavity 35 and unfolded along the side of auto 11. Thus, the automobile side protector extends essentially completely along the side of an automobile.

When the cover is completely unfurled, the relatively rigid strip form member 24 is inserted in hood seam 25 while the hood is closed. Then supplemental flap retention means 19 may be secured to the bottom of the automobile along with the alignment of center portion 16 and any securing of that portion which may need to be accomplished, so that the automobile side protector of this invention is aesthetically pleasing as it is conformable about auto body 13.

When an individual returns to the automobile after leaving it parked and unattended, and it becomes necessary to store the automobile side protector, this can be easily accomplished by unfastening the supplemental flap retention means and any other supplemental retention means, removing planar member 24 from hood seam 25 while the hood is closed and folding the sheet form member and placing it in the open trunk cavity 35. However, it can be appreciated that yet a further advantage of this particular automobile side protector is the fact that in case of precipitation, the flexible sheet form member need not be folded at the time of its removal and may be placed in the trunk in an unfolded configuration for folding at a later time.

It will be readily apparent, from the foregoing detailed description of the illustrative embodiments of this invention, that a particularly novel and extremely effective automobile side protector is provided. The automobile side protector is relatively simple to fabricate and requires minimal amount of time for installation along the side of an automobile as well as removal for storage into the trunk thereof. The structure is economical to fabricate and reduces the problem of having the exterior metal skin and paint of a parked and unattended car dented or scratched.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An automobile side protector for protecting the paint of an automobile from scratches comprising a flexible sheet form member which is foldable, a portion of said sheet form member in the operative position of said side protector being retained in the interior of said automobile, said sheet form member having a front portion, said front portion having a top edge with a relatively rigid strip form member means positioned therealong for insertion into the hood seam while the hood is closed for retaining said strip form member means therein.

2. The automobile side protector as claimed in claim 1 wherein said sheet form member is stored with said portion of said sheet form meber being secured to the interior of said automobile, with the interior of said automobile being the trunk.

3. The automobile side protector as claimed in claim 1 wherein said sheet form member has a rear portion, said rear portion having interior retention means for securing said rear portion to the interior of said automobile.

4. The automobile side protector as claimed in claim 1 wherein said sheet form member has an exterior surface and an interior surface with an enclosure therebetween.

5. An automobile side protector for protecting the exterior metal skin and paint of an automobile comprising
   a flexible sheet form member having a front flap and a rear flap, said front flap having relatively planar retention means for insertion into a hood seam while the hood is closed for retention therein, said rear flap having a relatively nondeformable object secured thereto which restrains the separation of said sheet form member from said automobile when said relatively nondeformable member is positioned within said automobile.

6. The automobile side protector as claimed in claim 5 wherein said sheet form member has supplemental flap retention means which extend downwardly from each of said flaps and secure said flaps to said automobile.

7. The automobile side protector as claimed in claim 6 wherein said sheet form member has a center portion located between said front flap and said rear flap, said center portion having supplemental retention means, said supplemental retention means providing for additional securing of said center portion to said automobile.

8. The automobile side protector as claimed in claim 7 wherein said sheet form member extends essentially completely along the side of said automobile.

9. The automobile side protector as claimed in claim 8 wherein the front flap retention means has a top edge with a relatively rigid strip form member means positioned therealong for insertion into said seam.

10. The automobile side protector as claimed in claim 9 wherein said rear flap has interior retention means for securing said rear flap to the interior of said automobile.

11. The automobile side protector as claimed in claim 10 wherein said interior of said automobile is the trunk.

12. The automobile side protector as claimed in claim 11 wherein said supplemental flap retention means are elastic straps.

13. The automobile side protector as claimed in claim 12 wherein said rear flap has a greater height dimension than does the front flap.

14. The automobile side protector as claimed in claim 13 wherein said sheet form member covers approximately the upper sixty percent of the side of said automobile.

15. The automobile side protector as claimed in claim 13 wherein said supplemental retention means includes magnets.

16. The automobile side protector as claimed in claim 13 wherein said supplemental retention means includes a strap which encircles the handle of said automobile and is secured to said side protector.

17. The automobile side protector as claimed in claim 13 wherein said supplemental retention means includes a strap which is securable to said body of said automobile.

18. The automobile side protector as claimed in claim 5 wherein said sheet form member has an exterior surface and an interior surface with an enclosure therebetween.

19. An automobile side protector for protecting the paint of an automobile from scratches comprising
   a flexible, foldable sheet form member conformable to the body of said automobile, said sheet form member extending essentially completely along the side of said automobile, said sheet form member having a front flap and a rear flap of a greater height than said front flap, said front flap having a top edge with a relatively rigid strip form member means positioned there along for insertion into a seam of the front hood of said automobile, said rear flap having retention means for retaining a portion of said rear flap in the trunk of said automobile and having a relatively nondeformable object secured thereto which restrains the separation of said sheet form member from said automobile when said relatively nondeformable member is also positioned within said trunk, said sheet form member having elastic straps which extend downwardly from each flap, sheet form member having a center portion having supplemental retention means for providing for additional securing of said center portion to said automobile.

* * * * *